United States Patent
Raczek et al.

(10) Patent No.: US 9,882,447 B2
(45) Date of Patent: Jan. 30, 2018

(54) ELECTRIC MACHINE, ASSEMBLY AND ASSOCIATED METHOD

(71) Applicant: Regal Beloit America, Inc., Beloit, WI (US)

(72) Inventors: John Edward Raczek, Weston, WI (US); Christopher Thomas Ohrmundt, Wausau, WI (US); Jeffrey Patrick Nelessen, Merrill, WI (US); Laura Michelle Reamer, Wausau, WI (US); Allen Jonathan Barkholz, Wausau, WI (US)

(73) Assignee: Regal Beloit America, Inc., Beloit, WI (US)

( * ) Notice: Subject to any disclaimer, the term of this patent is extended or adjusted under 35 U.S.C. 154(b) by 280 days.

(21) Appl. No.: 14/734,103

(22) Filed: Jun. 9, 2015

(65) Prior Publication Data
US 2016/0365769 A1    Dec. 15, 2016

(51) Int. Cl.
| | | |
|---|---|---|
| *H02K 7/08* | (2006.01) | |
| *H02K 5/173* | (2006.01) | |
| *F16C 35/063* | (2006.01) | |
| *H02K 5/15* | (2006.01) | |

(52) U.S. Cl.
CPC ......... *H02K 5/1732* (2013.01); *F16C 35/063* (2013.01); *H02K 5/15* (2013.01); *H02K 2213/09* (2013.01)

(58) Field of Classification Search
CPC ........... H02K 7/08; H02K 7/083; H02K 7/085
USPC .... 310/90; 384/91, 129, 276, 282, 564, 565, 384/490, 548, 588
See application file for complete search history.

(56) References Cited

U.S. PATENT DOCUMENTS

| | | | |
|---|---|---|---|
| 1,364,579 A | 1/1921 | Noble | |
| 1,597,314 A | 8/1926 | Howard et al. | |
| 2,500,478 A | 3/1950 | Warren | |
| 3,450,398 A | 6/1969 | Barnes et al. | |
| 3,829,726 A | 8/1974 | Nilsson | |
| 4,125,790 A * | 11/1978 | Stratienko | F16D 21/06 251/129.03 |
| 4,163,914 A * | 8/1979 | Keyes | H02K 49/00 310/103 |
| 4,207,815 A | 6/1980 | Watanabe | |
| 4,431,062 A | 2/1984 | Wanner et al. | |
| 4,501,981 A * | 2/1985 | Hansen | H01F 7/08 310/209 |
| 4,519,734 A * | 5/1985 | Mitchell | B23Q 1/265 384/490 |
| 4,599,530 A | 7/1986 | Laing | |
| 5,427,188 A | 6/1995 | Fisher | |
| 6,032,466 A | 3/2000 | Woollenweber et al. | |
| 6,272,970 B1 | 8/2001 | Schaefer | |
| 6,691,850 B2 | 2/2004 | Aschoff et al. | |

(Continued)

*Primary Examiner* — Jeremy Luks
(74) *Attorney, Agent, or Firm* — John Wagley (57) ABSTRACT

An electric machine is provided. The electric machine includes a stator and a rotor. The rotor is rotatably secured to the stator. The electric machine further includes a shaft secured to the rotor and a sleeve. The sleeve defines a bore and an outer periphery of the sleeve. The sleeve is slidably secured to the shaft. The electric machine further includes a bearing defining a bore of the bearing. At least a portion of the bore of bearing is fixedly secured to at least a portion of the outer periphery of the sleeve.

20 Claims, 7 Drawing Sheets

(56) References Cited

U.S. PATENT DOCUMENTS

| | | | |
|---|---|---|---|
| 6,707,207 B1* | 3/2004 | Khanna | G11B 5/4813 |
| | | | 310/156.32 |
| 8,593,025 B2 | 11/2013 | Richter et al. | |
| 9,102,226 B2 | 8/2015 | Makino | |
| 2004/0101220 A1* | 5/2004 | Elmgren | F16D 3/845 |
| | | | 384/477 |
| 2007/0193835 A1 | 8/2007 | Wang | |
| 2008/0236933 A1 | 10/2008 | Kurokawa | |
| 2009/0294203 A1 | 12/2009 | Okada et al. | |
| 2011/0200282 A1 | 8/2011 | Shinohara | |
| 2013/0181085 A1* | 7/2013 | Turley | B65H 19/2276 |
| | | | 242/520 |
| 2013/0206087 A1 | 8/2013 | Tadokoro | |
| 2013/0213163 A1* | 8/2013 | Nakamura | H02K 37/14 |
| | | | 74/89.34 |
| 2013/0280110 A1 | 10/2013 | Gutjahr et al. | |
| 2014/0241864 A1 | 8/2014 | Weiss et al. | |

\* cited by examiner

ELECTRIC MACHINE, ASSEMBLY AND ASSOCIATED METHOD

BACKGROUND OF THE INVENTION

The embodiments described herein relate generally to electric machines, and more specifically, to a mechanism for securing a machine shaft to a bearing.

Rotating mechanical mechanisms typically have bearings for supporting the rotating components of the mechanism relative to the stationary components. For rolling element bearings, those having balls, rollers or spherical rollers, typically one element or race is fixed to the rotating component and the other element or race is fixed to the stationary component. The rolling elements provide for motion between one race and the other race.

Fixing the races to the rotating component and to the stationary component can be accomplished by interference fit of bores to diameter or by forces applied to the faces of the races. Due to tolerance stacks from manufacturing inaccuracies, thermal expansion of differing materials and assembly inaccuracies, providing interference fits on both races typically results in an unacceptable axial preload on the bearing.

For applications where the radial load on the bearing remains in a fixed direction during the mechanism's duty cycle the rotating component may have an interference fit to the race and the stationary component may have a clearance fit to the race. This arrangement avoids axial preload on the races. Forces in such a mechanism do not cause the race to move rotationally relative to the stationary component.

For applications where the radial load on the bearing changes direction during the mechanism's duty cycle, precession or a tendency of the race to move rotationally slightly during the duty cycle often occurs. This precession may cause fretting or wear on the shaft or housing. The fretting and wear can create particles that may migrate through the mechanism. The particles may propagate into the lubricant and into the bearing rolling elements, leading to shortened bearing life.

Alternatively, a feature on the race bore, the race outside diameter or race face may cooperate with a feature on the rotating component and to the stationary component, typically a shaft or housing, to provide physical interference between the race and the component. Such features, however, add significant costs and provide stress risers to the race and component.

The present invention is directed to alleviate at least some of these problems with the prior art.

BRIEF DESCRIPTION OF THE INVENTION

According to an embodiment of the invention, an electric machine is provided. The electric machine includes a stator and a rotor. The rotor is rotatably secured to the stator. The electric machine further includes a shaft secured to the rotor and a sleeve. The sleeve defines a bore and an outer periphery of the sleeve. The sleeve is slidably secured to the shaft. The electric machine further includes a bearing defining a bore of the bearing. At least a portion of the bore of bearing is fixedly secured to at least a portion of the outer periphery of the sleeve.

According to an aspect of the invention, the electric machine may be provided wherein the bearing includes a rolling element bearing having an inner race, an outer race and a plurality of rolling elements and wherein the inner race of the bearing is fixedly secured to the outer periphery of the sleeve.

According to another aspect of the invention, the electric machine may be provided wherein at least one of the sleeve and the shaft includes a feature for limiting relative rotation motion between the sleeve and the shaft.

According to yet another aspect of the invention, the electric machine may be provided wherein the feature includes a protrusion extending from one of the outer periphery of the shaft and the bore of the sleeve and a wall. The wall defines a void formed in the other of the outer periphery of the shaft and the bore of the sleeve. The void is adapted to cooperate with the protrusion to permit at least some axial movement between the sleeve and the shaft and to limit rotational movement between the sleeve and the shaft.

According to yet another aspect of the invention, the electric machine may be provided wherein the protrusion includes a pin.

According to yet another aspect of the invention, the electric machine may be provided wherein the feature includes a first wall defining a first void formed in the outer periphery of the shaft. The feature also includes a second wall defining a second void formed in the bore of the sleeve. The feature further includes a member adapted to cooperate with the first wall and the second wall to permit at least some axial movement between the sleeve and the shaft and to limit rotational movement between the sleeve and the shaft.

According to yet another aspect of the invention, the electric machine may be provided wherein the member includes a key.

According to yet another aspect of the invention, the electric machine may be provided wherein the shaft defines first and second spaced apart circumferential grooves formed in the outer periphery of the shaft and wherein at least a portion of the bore of the sleeve is axially positioned between the grooves.

According to yet another aspect of the invention, the electric machine may further include first and second seals respectively positioned at least partially in the first and second grooves.

According to yet another aspect of the invention, the electric machine may further include a lubricant positioned between the shaft and the sleeve.

According to yet another aspect of the invention, the electric machine may further include a second bearing spaced from the first bearing. The second bearing defines a second bearing bore. At least a portion of the second bore of the bearing is fixedly secured to the shaft.

According to another embodiment of the invention, an assembly for use in an electric machine having a stator and a rotor is provided. The assembly includes a shaft secured to the rotor and a sleeve defining a bore and an outer periphery of the sleeve. The sleeve is slidably secured to the shaft. The assembly also includes a bearing defining a bore of the bearing. At least a portion of the bore of the bearing is fixedly secured to at least a portion of the outer periphery of the sleeve.

According to another aspect of the invention, the assembly may be provided wherein the bearing includes a rolling element bearing including an inner race, an outer race and a plurality of rolling elements and wherein the inner race is bearing fixedly secured to the outer periphery of the sleeve.

According to yet another aspect of the invention, the assembly may be provided wherein the sleeve and/or the shaft includes a feature for limiting relative rotation motion between the sleeve and the shaft.

According to yet another aspect of the invention, the assembly may be provided wherein the feature includes a protrusion extending from one of the outer periphery of the shaft and the bore of the sleeve and a wall. The wall defines a void formed in the other of the outer periphery of the shaft. The bore of the sleeve is adapted to cooperate with the protrusion to permit at least some axial movement between the sleeve and the shaft and to limit rotational movement between the sleeve and the shaft.

According to yet another aspect of the invention, the assembly may be provided wherein the feature includes a first wall and a second wall. The first wall defines a first void formed in the outer periphery of the shaft. The second wall defines a second void formed in the bore of the sleeve. The feature also includes a member adapted to cooperate with the first wall and a second wall to permit at least some axial movement between the sleeve and the shaft and to limit rotational movement between the sleeve and the shaft.

According to yet another aspect of the invention, the assembly may be provided wherein the shaft defines first and second spaced apart circumferential grooves formed in the outer periphery of the shaft and wherein at least a portion of the bore of the sleeve is axially positioned between the grooves.

According to another embodiment of the invention, a method for securing a bearing to a shaft in an electric machine is provided. The method includes the steps of providing an electric machine housing, fixedly securing a bearing to the housing, fixedly securing a sleeve to the bearing, and securing the sleeve to the shaft while providing limited axial and rotational relative motion therebetween.

According to yet another aspect of the invention, the method may be provided wherein the step of slidably securing a sleeve to the shaft includes the step of providing a protrusion extending from one of the outer periphery of the shaft and the bore of the sleeve and providing a wall defining a void formed in the other of the outer periphery of the shaft and the bore of the sleeve, the step of adapting the wall to cooperate with the protrusion, the step of permitting at least some axial movement between the sleeve and the shaft, and the step of limiting rotational movement between the sleeve and the shaft.

According to yet another aspect of the invention, the method may be provided wherein the step of slidably securing a sleeve to the shaft includes the steps of providing a first wall defining a first void formed in the of the outer periphery of the shaft, providing a second wall defining a second void formed in the bore of the sleeve, providing a member, adapting the member to cooperate with the first void and the second void, permitting at least some axial movement between the sleeve and the shaft, and limiting rotational movement between the sleeve and the shaft.

DETAILED DESCRIPTION OF THE INVENTION

Rotating mechanical mechanisms typically have bearings for supporting the rotating components of the mechanism relative to the stationary components. For rolling element bearings, those having balls, rollers or spherical rollers, typically one element or race is fixed to the rotating component and the other element or race is fixed to the stationary component. The rolling elements provide for motion between one race and the other race.

Fixing the races to the rotating component and to the stationary component can be accomplished by interference fit of bores to diameter or by forces applied to the faces of the races. Due to tolerance stacks from manufacturing inaccuracies, thermal expansion of differing materials and assembly inaccuracies, providing interference fits on both races of both bearings typically results in an unacceptable axial preload on the bearings.

For applications where the radial load on the bearing remains in a fixed direction during the mechanism's duty cycle the rotating component may have an interference fit to the race and the stationary component may have a clearance fit to the race. This arrangement avoids axial preload on the races. Forces in such a mechanism do not cause the race to move rotationally relative to the stationary component.

For applications where the radial loads on the bearings change direction during the mechanism's duty cycle, for example where eccentric loads are rotated, for example on vibratory shakers, precession or a tendency of the race to move rotationally slightly during the duty cycle often occurs. This precession may cause fretting or wear on the shaft or housing. The fretting and wear can create particles that may migrate through the mechanism. The particles may propagate into the lubricant and into the bearing rolling elements, leading to shortened bearing life.

Alternatively, a feature on the race bore, the race outside diameter or race face may cooperate with a feature on the rotating component and to the stationary component, typically a shaft or housing, to provide physical interference between the race and the component. Such features, however, add significant costs and provide stress risers to the race and component.

An electric machine, for example an electric motor or an electric generator are widely used mechanisms with bearings. For applications using electrical motors where the radial loads on the bearings change direction during the mechanism's duty cycle, for example where eccentric loads are rotated, for example on vibratory shakers movement between races and components may cause such fretting and wear.

Technical effects of the methods, systems, and apparatus described herein include at least one of reduced cost, improved serviceability, improved performance and quality and reduced labor costs.

Figure 1:
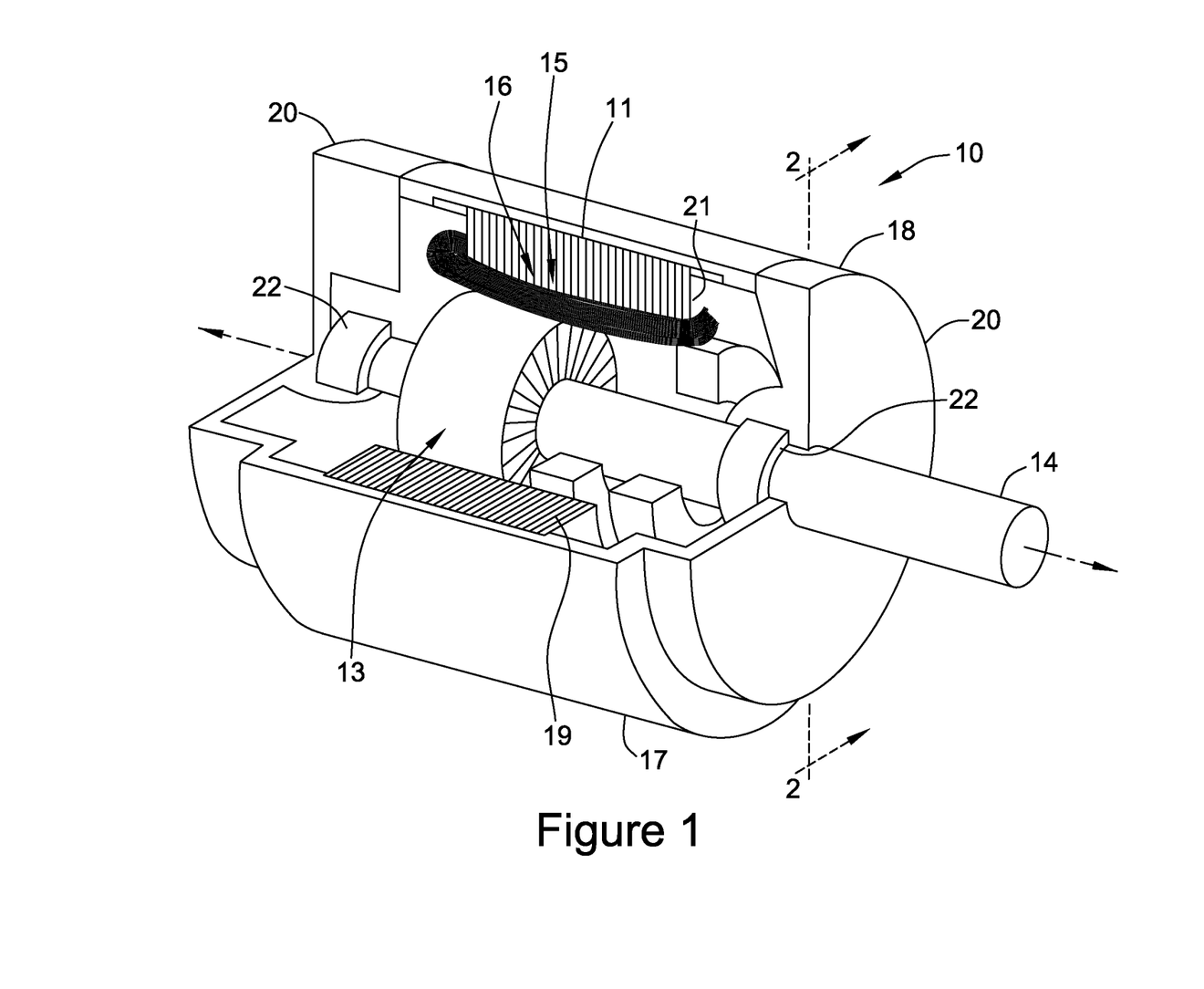
FIG. 1 is a perspective view, partially in cross section, of an embodiment of the present invention in the form of an electric machine.

According to an embodiment of the present invention and referring to FIG. 1, an electric machine 10 is provided. The electric machine 10 may be an electric motor or an electric generator, but hereinafter will be described as an electric motor 10. It should be appreciated that the electric motor may be used to power any mechanism, for example, a pump, a cyclic drive, a compressor, a vehicle, a fan or a blower.

The electric motor 10 typically includes a centrally located motor shaft 14 that rotates relative to the motor 10. Electrical energy applied to coils 15 within the motor 10. The coils generate an electromagnetic field that cooperates with an electromagnetic field in rotor 13 mounted to the motor shaft 14. The coils 15 initiate relative motion between the shaft 14 and the motor 10 that transfers the power from the coils to the shaft 14.

A stationary assembly 16, also referred to as a stator, includes stator core 11 and coils 15 or windings positioned around portions of the stator core. It is these coils to which energy is applied to initiate this relative motion which transfers the power to the shaft. These coils 15 are formed by winding wire (not shown), typically copper, aluminum or a combination thereof, about a central core to form the winding or coil. An electric current is directed through the coils 15 which induces a magnetic field. It is the magnetic field that initiates this relative motion which transfers the power to the shaft 14. The stator core 11 typically includes a plurality of stator core laminations 19 that define stator teeth 21 around which the coils 15 are wound.

Typically the motor 10 includes a housing 17 having an inner wall or surface that defines a motor cavity therein. The housing 17 may include a plurality of components and may be made of a suitable durable material, for example a metal, a polymer or a composite. The housing 17 may, as shown, include a cylindrical body 18 and opposed end caps 20.

It should be appreciated that the housing of the motor may have any suitable shape. One common shape of a motor housing is that of a cylindrical solid, having a generally cylindrical cross section. The shaft on a motor with such a shape generally extends from an end of the motor.

The motor 10 may have any suitable size and shape and may be, for example, an induction motor, a permanent-split capacitor (PSC) motor, an electronically commutated motor (ECM) motor, or a switched reluctance motor. The housing 17 may include protrusions, for example fins (not shown), for dissipation of heat. The motor 10 may also include a fan (not shown) positioned within housing 17.

Figure 2:
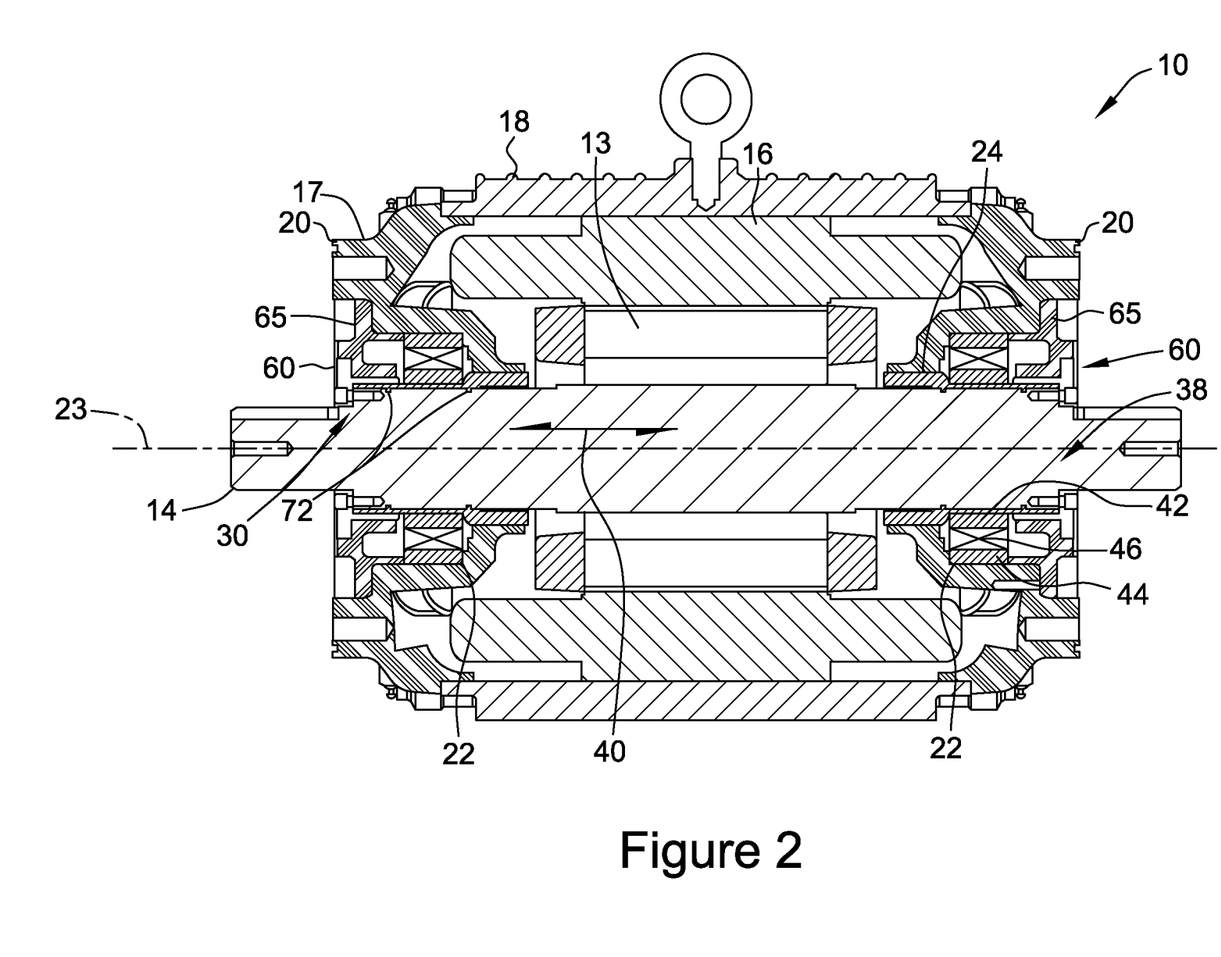
FIG. 2 is a cross sectional view of the electric machine of FIG. 1, along the lines 2-2 in the direction of the arrows.

According to an embodiment of the invention and referring to FIG. 2, electric machine 10 is provided. The electric machine 10 includes stator 16 and rotor 13. The rotor 13 is rotatably secured to the stator. Bearings 22 may, for example, be used to provide this rotating securing. The electric machine 10 further includes shaft 14 secured to the rotor 13. The shaft 14 rotates about shaft rotation axis or centerline 23.

The electric machine 10 further includes a sleeve 24. The sleeve defines a bore 26 and an outer periphery 28 of the sleeve 24. The sleeve 24 is slidably secured to the shaft 14. Note that the sliding securing of the sleeve 24 to the shaft 14 may occur on axial floating or clearance bearing mount 30.

The electric machine 10 further includes bearing 2222 defining a bore 34 of the bearing 22. At least a portion of the bore 34 of bearing 22 is fixedly secured to at least a bearing mounting portion 36 of the outer periphery 28 of the sleeve 24.

As shown in FIG. 2, the rotor 13 is rotatably supported in housing 17 by two spaced apart bearings 22. The bearings 22 are rotatably fixedly secured to the housing 17 and rotatably secured to rotor 13.

To avoid preloading of the bearings 22 and according to an embodiment of the present invention, the motor 10 includes the axially floating or clearance bearing mount 30 and a fixed or axial locked bearing mount 38. As shown, sleeve 24 is positioned between the bearing 22 and the shaft 14, with one sleeve 24 being used with one of the bearings 22 associated with the clearance bearing mount 30 and the other of the bearings 22 associated with the fixed or axial locked bearing mount 38.

Each of the sleeves 24 has bearing mounting portion 36 for engaging bore 34 of bearing 22. The sleeve 24 is fixed secured to the bearing 22 by any suitable method such as by adhesives, by interference fit or by a mechanical interlock (not shown), for example, by pins, splines or keys (not shown). For simplicity, an interference fit may be preferred.

The axially floating or clearance bearing mount 30 provides for limited motion of the shaft 14 with respect to the sleeve 24 in the direction of arrows 40. Conversely the fixed or axial locked bearing mount 38 provides for no motion of the shaft 14 with respect to the sleeve 24 in the direction of arrows 40.

The bearings 22 may be any bearing and may be sleeve bearings or rolling element bearings. If the bearings 22 are rolling element bearings, they may, as shown in FIG. 2, have an inner race 42, an outer race 44 and a plurality of rolling elements 46. If the bearings 22 are rolling element bearings, the rolling elements 46 may be in the form of balls, cylinders or, as shown, spherical rollers. The bearings 22 may include a cage or retainer 48 for keeping the rollers 46 from skewing or becoming unevenly spaced apart.

Figure 3:
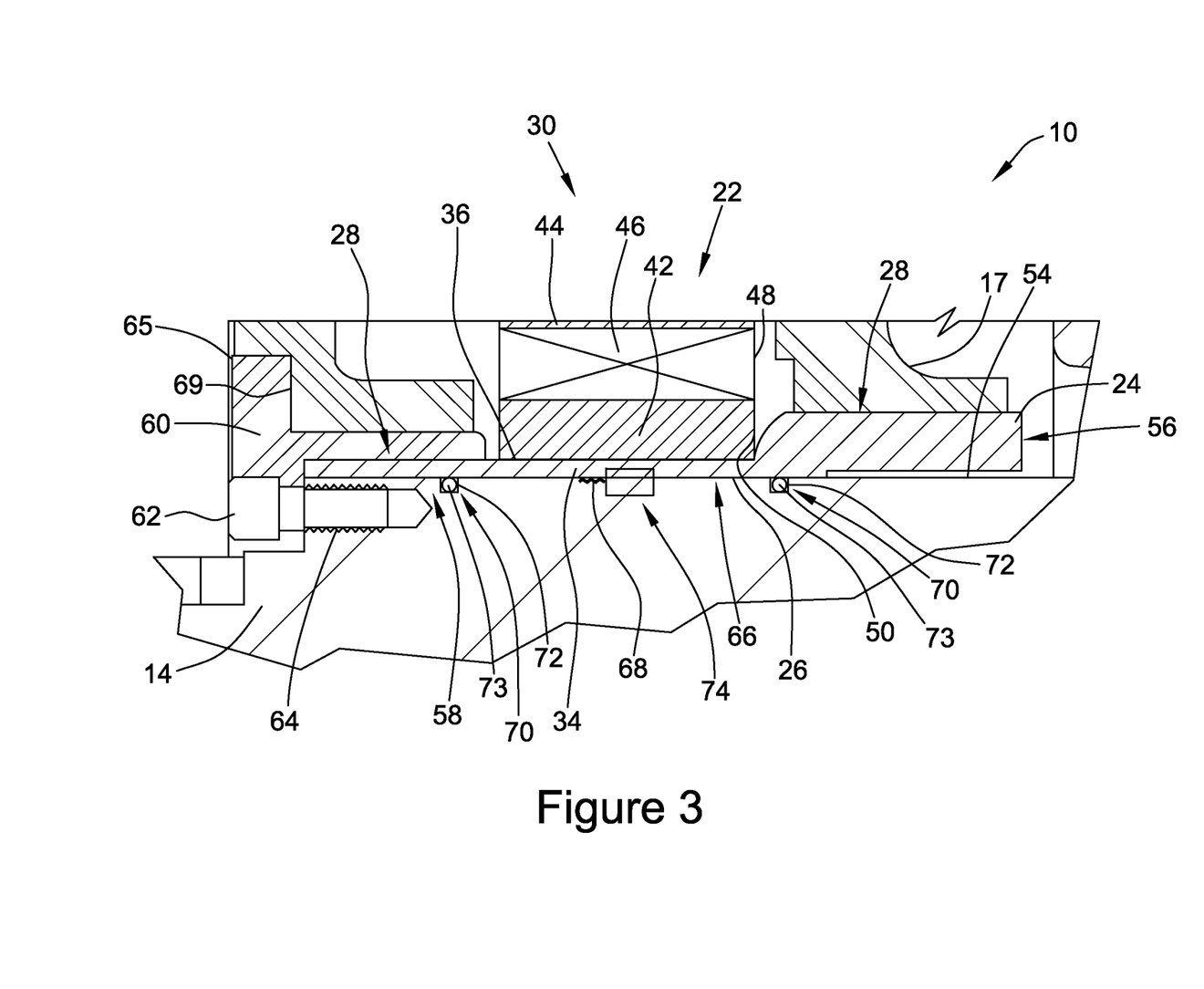
FIG. 3 is a partial cross sectional view of the electric machine of FIG. 1, showing the floating bearing mount in greater detail.

Referring now to FIG. 3, the axial floating or clearance bearing mount 30 is shown in greater detail. The clearance bearing mount 30 includes sleeve 24 which is fixed secured to bearing bore 34 of inner race 42 of bearing 22 at portion 36 of outer periphery 28 of sleeve 24. As shown, the inner race may be positioned against face 50 of shoulder 52 of sleeve 24. The sleeve 24 is spaced from housing 17. It should be appreciated that the shoulder 52 may not be needed as an interference fit between the inner race 42 and the sleeve 42 may be sufficient to securely position the bearing 22 on shaft 14.

As shown in FIG. 3, the bore 26 of the sleeve 24 is in intimate contact with outer diameter 54 of shaft 14, at least under the bearing inner race 42. The bore 26 of the sleeve 24 may, as shown, include a first relieved portion 56 interior of bearing 22. The bore 26 of the sleeve 24 may include a second portion 58 exterior of bearing 22. The second portion 58 may, as shown, not be relieved. Alternatively the second portion 58 may be relieved, similarly to the first relieved portion 56. The relieving of portions 56 and 58 may result in reduced fretting between the sleeve 24 and the bearing 22.

As shown in FIG. 3, the sleeve 24 and the bearing 22 may be retained within motor 10 by retaining device 60 in the form of, for example, a retainer. The retainer 60 may be connected to shaft 14 by fasteners 62 in the form of cap screws which extend axially through the retainer and which are attached to the shaft 14 by threads 64 in the shaft 14. Alternatively, the retainer 60 may have internal threads (not shown) which mate with external threads (not shown) on the shaft 14. The retainer 60 rotates with the shaft 14. In conjunction with retainer 60 of the fixed or axial locked bearing mount 38, the retainer 60 retains and limits the axial movement of the shaft 14 and the sleeves 24 with respect to the housing 17 of the motor 10.

A seal 65 may be positioned between the retainer 60 and the housing 17. The seal 65, alternatively, may have seal labyrinth protrusions (not shown) that mate with retainer labyrinth protrusions (not shown) of the retainer. The seal 65 may be fixedly secured to housing 17. The seal may be a lip seal (not shown) or may have any other suitable configuration. Seals 65 may be associated both with the clearance bearing mount 30 and the locked bearing mount 38.

To reduce fretting and the propagation of wear particles, the axially floating or clearance bearing mount 30 of the motor 10 may further include a lubrication feature 66 located between the sleeve 24 and the shaft 14. The lubrication feature 66 may be simply the administration of lubricant 68, for example grease, between the outside diameter 54 of shaft 14 and the bore 26 of sleeve 24, particularly under the inner race 42 of bearing 22.

The lubrication feature 66 may further include a retaining feature 70 for retaining the fretting particles and/or the lubricant 68. For example and as shown in FIG. 3, the retaining feature 70 may be in the form of spaced apart grooves 72 formed in shaft 14 which are adapted to secure o-rings 73 which mate with the bore 26 of sleeve 24 to retain the fretting particles and/or the lubricant 68.

To reduce fretting and the propagation of wear particles, the axially floating or clearance bearing mount 30 motor 10 may further include a feature 74 for limiting the relative rotation motion between the sleeve 24 and said shaft 14. The feature 74 may further serve to limit the relative axial motion between the sleeve 24 and said shaft 14. It should be appreciated that such relative axial motion between the sleeve 24 and said shaft 14 may be also limited by the retainer 60, as described above.

Figure 4:
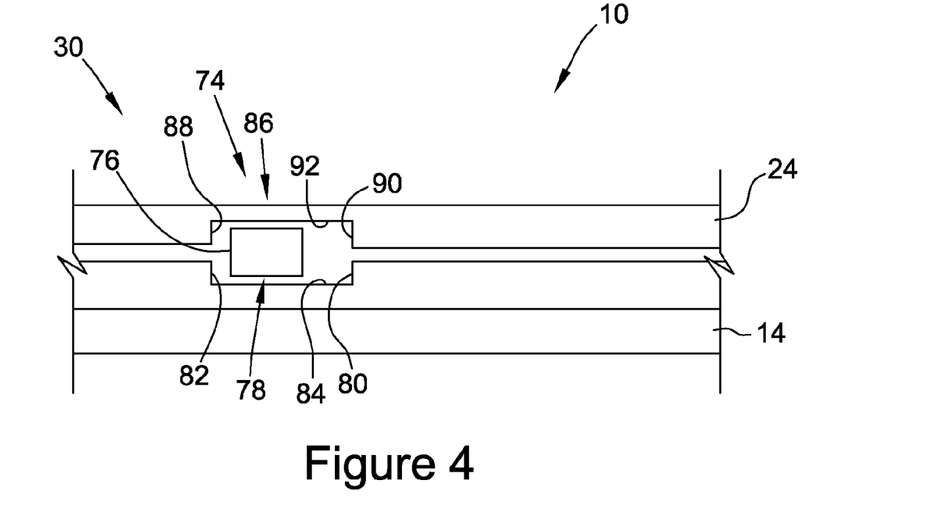
FIG. 4 is a partial cross sectional view of the floating bearing mount of FIG. 3, showing the floating mechanism in greater detail.
Figure 4A:
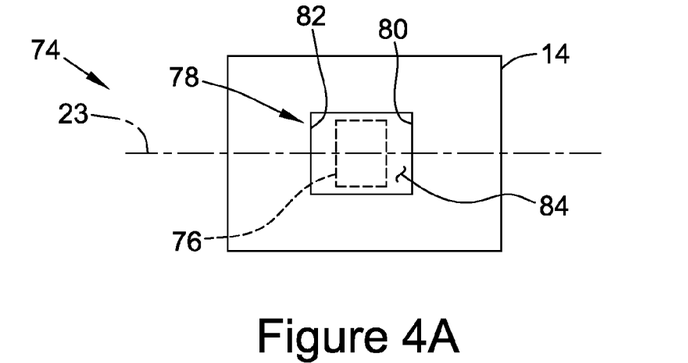
FIG. 4A is a partial cross sectional view of the floating mechanism of FIG. 4, showing the void in the shaft in greater detail.
Figure 4B:
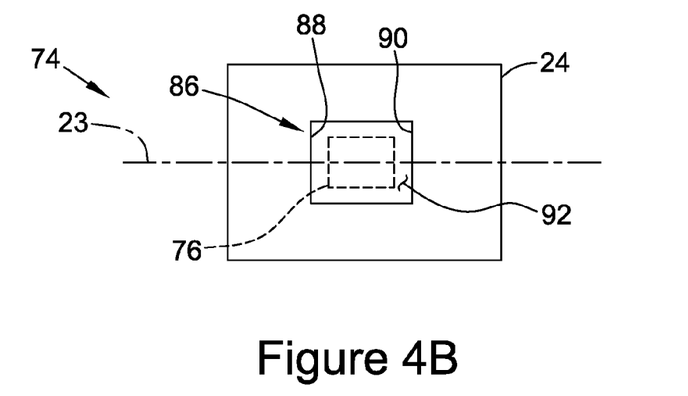
FIG. 4B is a partial cross sectional view of the floating mechanism of FIG. 4, showing the void in the sleeve in greater detail.

Referring now to FIGS. 4, 4A and 4B, the feature 74 may have any suitable shape and may for example be in the form of a member 76 in the form of, for example a key 76. The key 76 may have any shape and may, for simplicity be rectangular. The key 76 may, as shown, be positioned between the sleeve 24 and the shaft 14.

The shaft 14 may define a shaft void or shaft pocket 78 formed in outer periphery 54 of shaft 14. The shaft pocket 78 is partially defined by a first shaft pocket wall 80. The shaft pocket 78 may have any shape and for simplicity may be rectangular and defined by radially extending shaft pocket walls 82 and a shaft pocket bottom 84.

The sleeve 24 may define a sleeve void or sleeve pocket 86 formed in bore 26 of sleeve 24. The sleeve pocket 86 is partially defined by a first sleeve pocket wall 88. The sleeve pocket 86 may have any shape and for simplicity may be rectangular and defined by radially extending sleeve pocket walls 90 and a sleeve pocket bottom 92. The key 76 adapted to cooperate with the first shaft pocket wall 80 of shaft 14 and the first sleeve pocket wall 88 to permit at least some axial movement between the sleeve 24 and the shaft 14 and to limit rotational movement between the sleeve 24 and the shaft 14.

Figure 4C:
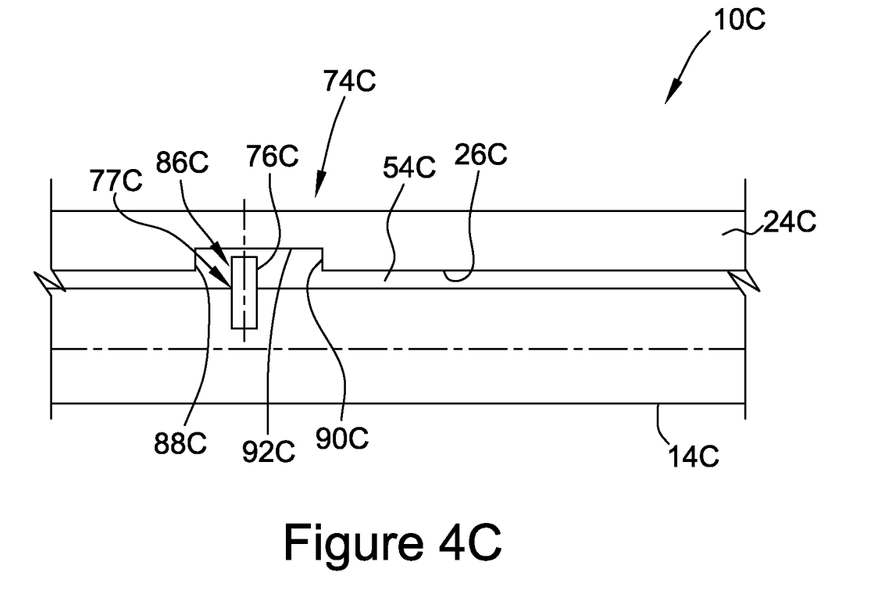
FIG. 4C is a partial cross sectional view of an alternate embodiment of the electric machine of the present invention, showing a floating mechanism with a protrusion on the shaft.

Alternatively and referring now to FIG. 4C, an electric machine 10C, similar to machine 10 of FIGS. 1-4, may be provided with feature 74C for limiting the relative rotation motion between sleeve 24C and shaft 14C. Feature 74C includes a protrusion 76C extending outwardly from outer periphery 54C of the shaft 14C. The protrusion 76C may, for example, be in the form of a pin 76C. The pin 76C may for simplicity be cylindrical and be fitted in opening 77C in shaft 14C.

A sleeve 24C may define a sleeve void or sleeve pocket 86C formed in bore 26C of sleeve 24C. A sleeve pocket 86C is partially defined by a first sleeve pocket wall 88C. The sleeve pocket 86C may have any shape and for simplicity may be rectangular and defined by radially extending sleeve pocket walls 90C and a sleeve pocket bottom 92C. The pin 76C is adapted to cooperate with the first sleeve pocket wall 88C to permit at least some axial movement between the sleeve 24C and the shaft 14C and to limit rotational movement between the sleeve 24C and the shaft 14C.

Figure 4D:
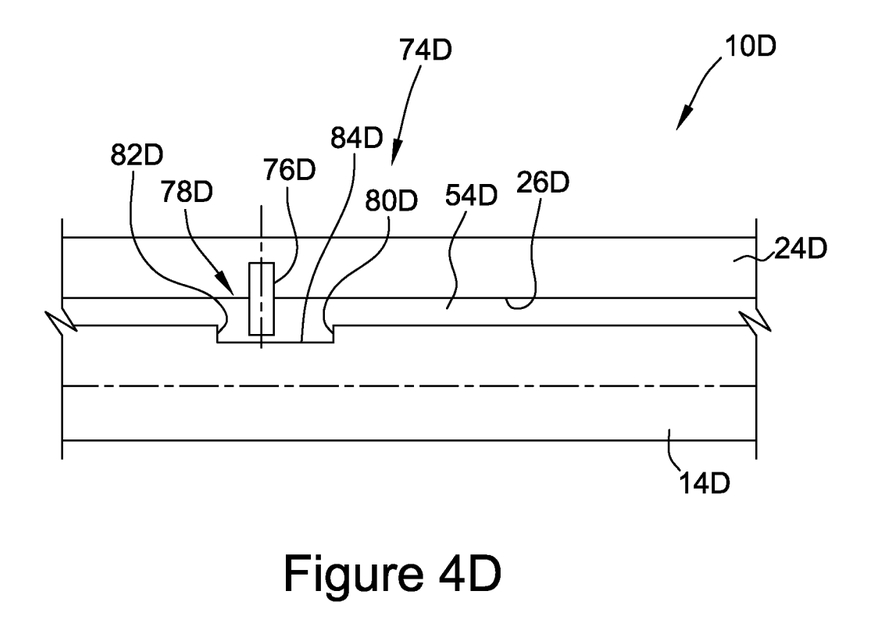
FIG. 4D is a partial cross sectional view of an alternate embodiment of the electric machine of the present invention, showing a floating mechanism with a protrusion in the sleeve.

Alternatively and referring now to FIG. 4D, electric machine 10D, similar to machine 10 of FIGS. 1-4, may be provided with feature 74D for limiting the relative rotation motion between sleeve 24D and shaft 14D. Feature 74D includes a protrusion 76D extending inwardly from bore 26D of the sleeve 24D. The protrusion may for example be in the form of a pin 76D. The pin 76D may for simplicity be cylindrical and extend inward The shaft 14D may define a shaft void or shaft pocket 78D formed in outer periphery 54D of shaft 14D. The shaft pocket 78D is partially defined by a first shaft pocket wall 80D. The shaft pocket 78D may have any shape and for simplicity may be rectangular and defined by radially extending shaft pocket walls 82D and a shaft pocket bottom 84D.

The pin 76D is adapted to cooperate with the first shaft pocket wall 80D to permit at least some axial movement between the sleeve 24D and the shaft 14D and to limit rotational movement between the sleeve 24D and the shaft 14D.

Figure 5:
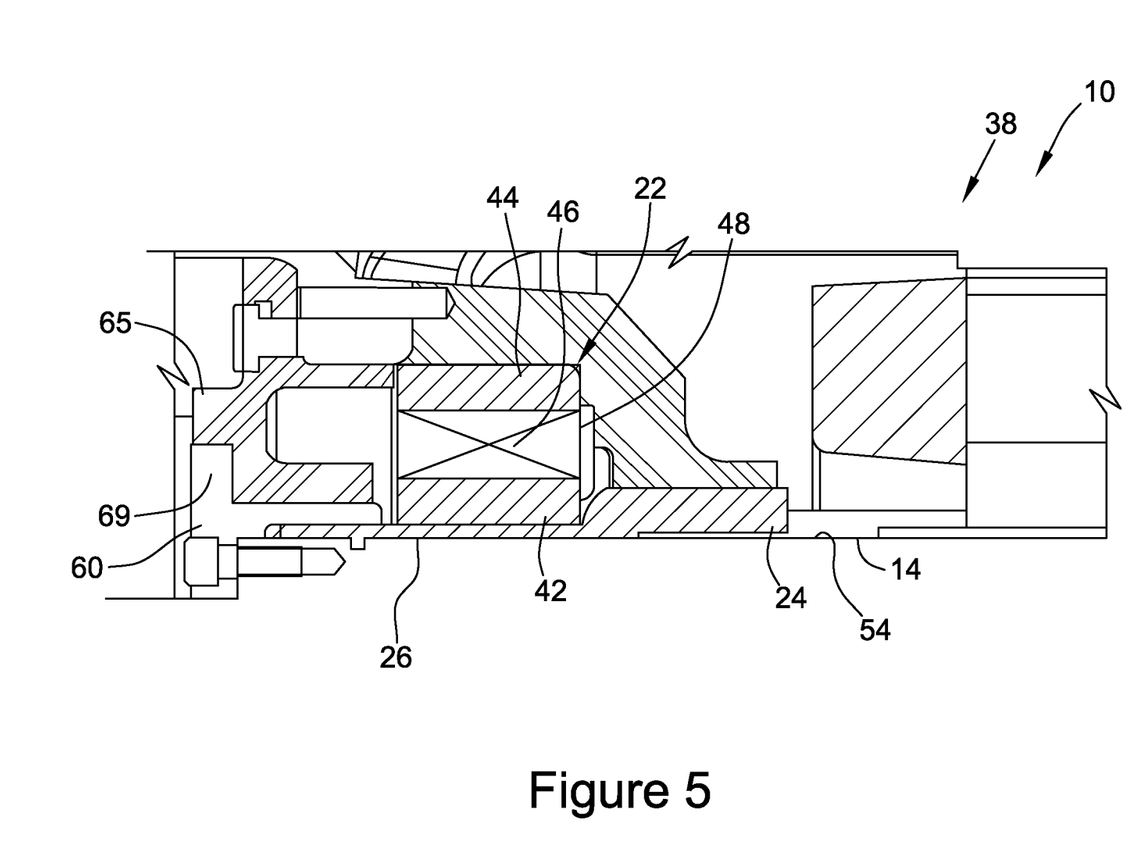
FIG. 5 is a partial cross sectional view of the electric machine of FIG. 1, showing the fixed bearing mount in greater detail.

Referring now to FIGS. 3 and 5, the fixed or axial locked bearing mount 38 is shown in greater detail. The axial locked bearing mount 38 includes sleeve 24 which is fixed secured to bearing bore 34 of inner race 42 of bearing 22 at portion 36 of outer periphery 28 of sleeve 24. As shown, the inner race may be positioned against face 50 of shoulder 52 of sleeve 24. The sleeve 24 is spaced from housing 17.

As shown in FIG. 5, the bore 26 of the sleeve 24 is in intimate contact with outer diameter 54 of shaft 14.

As shown in FIG. 5, the sleeve 24 and the bearing 22 may be retained within motor 10 and locked to shaft 14 by retaining device 60 in the form of, for example, a retainer. The retainer 60 may be connected to shaft 14 by fasteners 62 in the form of cap screws which extend axially through the retainer and which are attached to the shaft 14 by threads 64 in the shaft 14. Alternatively, the retainer 60 may have internal threads (not shown) which mate with external threads (not shown) on the shaft 14. The retainer 60 rotates with the shaft 14.

Figure 6:
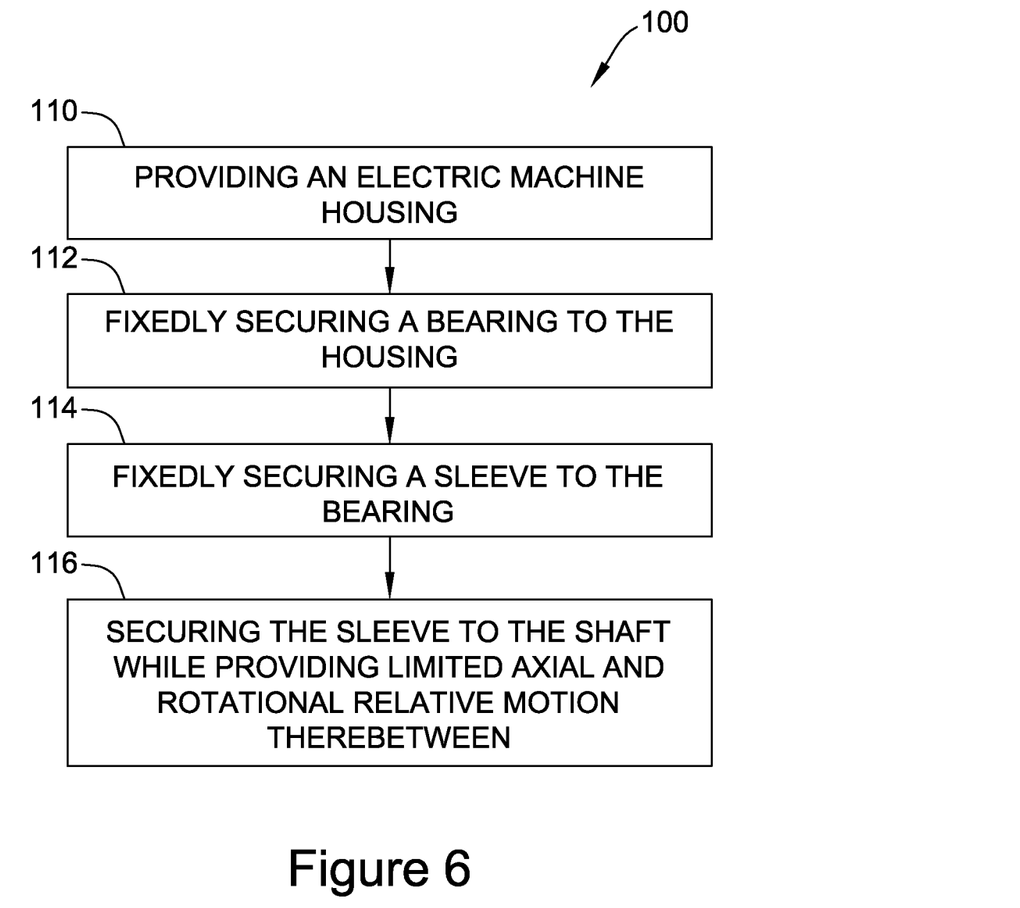
FIG. 6 is a flow chart of another embodiment of the present invention in the form of a method for providing an electric machine.

Referring now to FIG. 6, another embodiment of the present invention is shown as method 100 for securing a bearing to a shaft in an electric machine. The method includes step 110 of providing an electric machine housing, step 112 of fixedly securing a bearing to the housing, step 114 of fixedly securing a sleeve to the bearing, and step 116 of securing the sleeve to the shaft while providing limited axial and rotational relative motion therebetween According to yet another aspect of the invention, the method may be provided wherein the step of securing the sleeve to the shaft includes the step of providing a protrusion extending from one of the outer periphery of the shaft and the bore of the sleeve and providing a wall defining a void formed in the other of the outer periphery of the shaft and the bore of the sleeve, the step of adapting the wall to cooperate with the protrusion, the step of permitting at least some axial movement between the sleeve and the shaft, and the step of limiting rotational movement between the sleeve and the shaft.

According to yet another aspect of the invention, the method may be provided wherein the step of securing the sleeve to the shaft includes the steps of providing a first wall defining a first void formed in the of the outer periphery of the shaft, providing a second wall defining a second void formed in the bore of the sleeve, providing a member, adapting the member to cooperate with the first void and the second void, permitting at least some axial movement between the sleeve and the shaft, and limiting rotational movement between the sleeve and the shaft.

The methods, systems, and apparatus described herein facilitate efficient and economical assembly and operation of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "they" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing an improved bearing mounting arrangement that permits axial bearing float and reduces or eliminates shaft fretting. The methods, system and apparatus described herein may be used in any suitable application.

Exemplary embodiments of the electric machine and system are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine, comprising:
   a stator;
   a rotor rotatably secured to said stator;
   a shaft secured to said rotor, said shaft defining a sleeve engaging feature;
   a sleeve defining a bore and an outer periphery thereof, said sleeve slidably secured to said shaft, said shaft defining a shaft engaging feature; and
   a bearing comprising a rolling element bearing including an inner race, an outer race and a plurality of rolling element, the inner race defining a bore thereof, the bore of the inner race fixedly secured to the outer periphery of said sleeve, said sleeve engaging feature and said shaft engaging feature cooperating to prohibit substantial rotational relative motion between said sleeve and said shaft and to permit substantial axial motion between said shaft and said sleeve so as to prevent axial loading of the inner race relative to the outer race caused by relative axial motion of the shaft relative to the sleeve.

2. The electric machine in accordance with claim 1,
   wherein said sleeve engaging feature comprises a protrusion extending from the outer periphery of said shaft; and
   wherein said shaft engaging feature comprises a wall defining a void formed in the bore of the sleeve.

3. The electric machine in accordance with claim 1,
   wherein said sleeve engaging feature comprises a wall defining a void formed in the outer periphery of said shaft; and
   wherein said shaft engaging feature comprises a protrusion extending from the bore of the sleeve.

4. The electric machine in accordance with claim 3, wherein said
   protrusion comprises a pin.

5. The electric machine in accordance with claim 2, wherein said protrusion comprises a pin.

6. The electric machine in accordance with claim 3,
   wherein said sleeve engaging feature comprises a first wall defining a first void formed in the of the outer periphery of said shaft;
   wherein said shaft engaging feature comprises a second wall defining a second void formed in the bore of said sleeve; and further comprising a member adapted to cooperate with the first wall and the second wall to prohibit substantial rotational relative motion between said sleeve and said shaft and to permit substantial axial motion between said shaft and said sleeve.

7. The electric machine in accordance with claim 6, wherein said member comprises a key.

8. The electric machine in accordance with claim 1:
wherein said shall defines first and second spaced apart circumferential grooves formed in the outer periphery of said shaft; and
wherein at least a portion of the bore of said sleeve is axially positioned between the grooves.

9. The electric machine in accordance with claim 8, further comprising first and second seals respectively positioned at least partially in the first and second grooves.

10. The electric machine in accordance with claim 1, further comprising a lubricant positioned between said shaft and the sleeve.

11. The electric machine in accordance with claim 1, further comprising a second bearing spaced from the first mentioned bearing and defining a second bearing bore, at least a portion of the second bearing bore of said bearing fixedly secured to said shaft.

12. An assembly for use in an electric machine having a stator and a rotor, said assembly comprising:
a shaft secured to the rotor, said shaft defining a sleeve engaging feature;
a sleeve defining a bore and an outer periphery thereof, said sleeve slidably secured to said shaft, said sleeve defining a shaft engaging feature; and
a bearing defining a bore thereof, at least a portion of the bore of said bearing fixedly secured to at least a portion of the outer periphery of said sleeve, said sleeve engaging feature and said shaft engaging feature cooperating to prohibit substantial rotational relative motion between said sleeve and said shaft and to permit substantial axial motion between said shaft and said sleeve so as to prevent axial loading of the inner race relative to the outer race caused by relative axial motion of the shaft relative to the sleeve.

13. The assembly in accordance with claim 12:
wherein said bearing comprises a rolling element bearing including an inner race, an outer race and a plurality of rolling elements; and
wherein the inner race of said bearing is fixedly secured to the outer periphery of said sleeve.

14. The assembly in accordance with claim 12, wherein said sleeve engaging feature comprises a protrusion extending from the outer periphery of said shaft; and wherein said shaft engaging feature comprises a wall defining a void formed in the bore of the sleeve.

15. The assembly in accordance with claim 12:
wherein said sleeve engaging feature comprises a first wall defining a first void formed in the of the outer periphery of said shaft:
wherein said shaft engaging feature comprises a second wall defining a second void formed in the bore of said sleeve; and
further comprising a member adapted to cooperate with the fast wall and the second wall to prohibit substantial rotational relative motion between said sleeve and said shaft and to permit substantial axial motion between said shaft and said sleeve.

16. The assembly in accordance with claim 14, wherein said member comprises a key.

17. The assembly in accordance with claim 12:
wherein said shaft defines first and second spaced apart circumferential grooves formed in the outer periphery of said shaft; and
wherein at least a portion of the bore of said sleeve is axially positioned between the grooves.

18. A method for securing a bearing to a shaft in an electric machine, comprising:
providing an electric machine housing;
providing a rolling element bearing including an inner race, an outer race and a plurality of rolling element, the inner race defining a bore thereof;
fixedly securing the outer race of the bearing to the housing;
fixedly securing a sleeve to the bore of the inner race; and
providing a first wall defining a first void formed in the of the outer periphery of the shaft;
providing a second wall defining a second void formed in the bore of the sleeve;
providing a member;
adapting the member to cooperate with the first void and the second void;
prohibiting substantial rotational movement between the sleeve and the shaft; and
permitting substantial axial movement between the sleeve and the shaft, so as to prevent axial loading of the inner race relative to the outer race caused by relative axial motion of the shaft relative to the sleeve.

19. The method in accordance with claim 18, wherein the step of providing a member comprises providing a key.

20. The method in accordance with claim 18, wherein the step of providing a member comprises providing a rectangular key.

* * * * *